(12) United States Patent
Sasaki et al.

(10) Patent No.: US 6,400,525 B1
(45) Date of Patent: *Jun. 4, 2002

(54) THIN-FILM MAGNETIC HEAD AND METHOD OF MANUFACTURING SAME

(75) Inventors: Yoshitaka Sasaki; Atsushi Iijima, both of Tokyo (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,624

(22) Filed: Jan. 10, 2000

(30) Foreign Application Priority Data

Aug. 24, 1999 (JP) .......................................... 11-236269

(51) Int. Cl.⁷ ................................................. G11B 5/17
(52) U.S. Cl. ..................................................... 360/123
(58) Field of Search ................................ 360/126, 313, 360/314, 315, 316, 317, 318, 318.1, 319, 320, 321, 322, 323, 324, 324.1, 324.11, 325, 326, 327, 327.1, 327.11, 327.2, 327.21, 327.22, 327.23, 327.24, 327.3, 327.31, 327.32, 327.33

(56) References Cited

U.S. PATENT DOCUMENTS 5,729,887 A    3/1998   Irie .......................... 29/260.21
5,793,578 A  * 8/1998   Heim et al. .................. 360/126
6,034,847 A  * 3/2000   Komuro et al. ............. 360/126
6,154,346 A  * 11/2000  Sasaki ......................... 360/317

FOREIGN PATENT DOCUMENTS

JP        A-7-311912         11/1995

* cited by examiner

Primary Examiner—David Davis
(74) Attorney, Agent, or Firm—Oliff & Berridge, PLC

(57) ABSTRACT

A thin-film magnetic head and a method of manufacturing the same of the invention achieve a reduction in yoke length and prevent generation of voids in an insulating layer for isolating turns of a thin-film coil from each other. In the thin-film magnetic head of the invention, a recording head has: a bottom pole layer; a top pole layer; a recording gap layer located between pole portions of the pole layers; and a thin-film coil located between the pole layers. The bottom pole layer has a first portion located to face the thin-film coil; and a second portion forming the pole portion and connected to a surface of the first portion that faces the thin-film coil. The coil is placed on a side of the second portion. An insulating layer for insulating turns of the thin-film coil from each other includes a first insulating film and a second insulating film. The first insulating film is made of a photoresist, for example, and touches an insulating film. The first insulating film is placed to fill the space between the turns of the coil. The second insulating film is made of an inorganic insulating material and placed to cover the first insulating film.

5 Claims, 12 Drawing Sheets

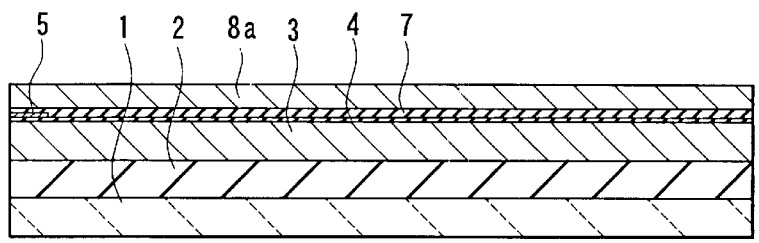 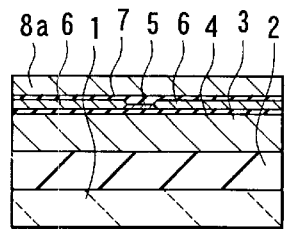
FIG. 1A  FIG. 1B
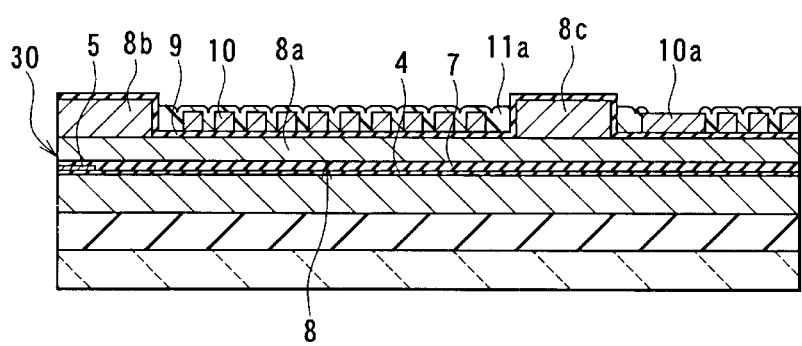 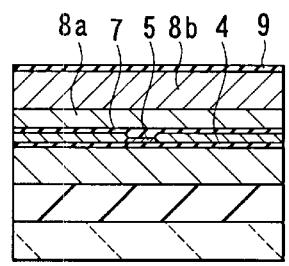
FIG. 2A  FIG. 2B
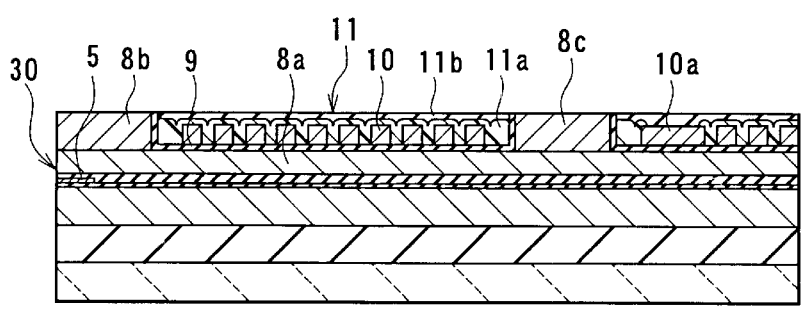 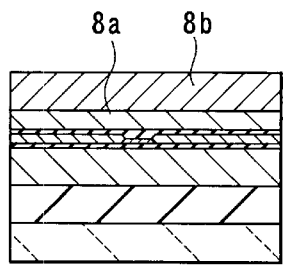
FIG. 3A  FIG. 3B

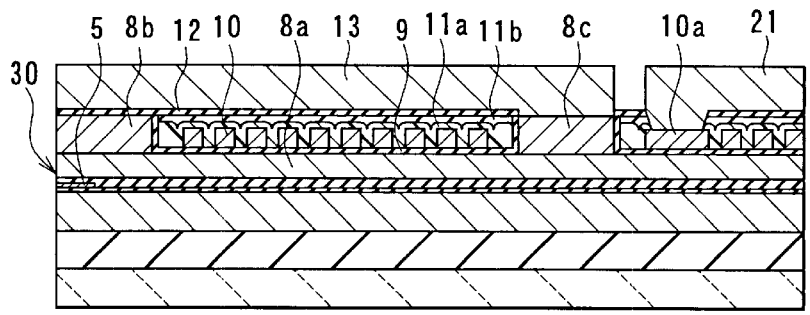
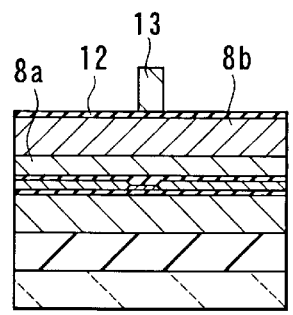
FIG. 4A  FIG. 4B
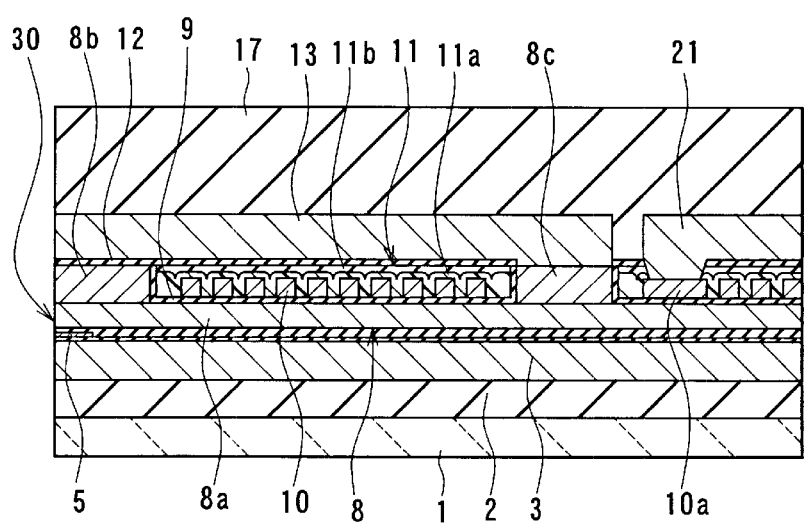
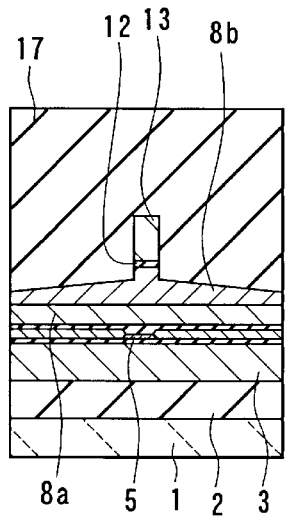
FIG. 5A  FIG. 5B

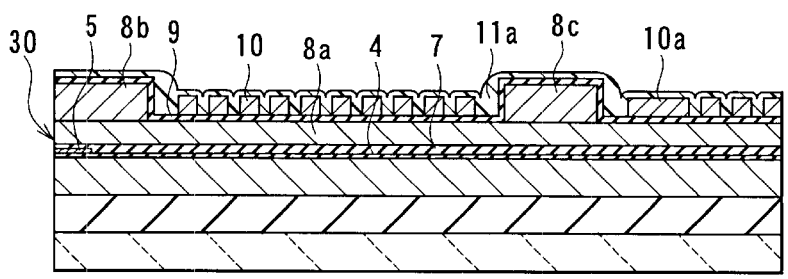
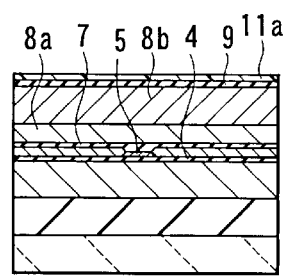
FIG. 7A  FIG. 7B
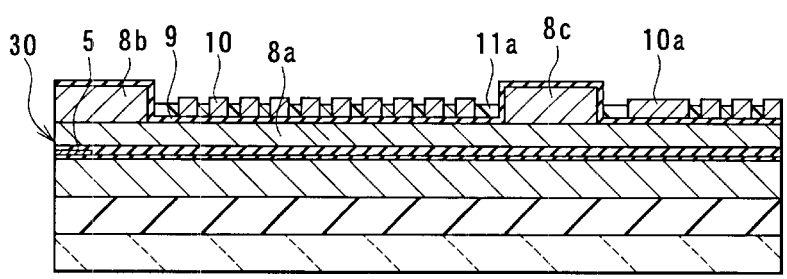
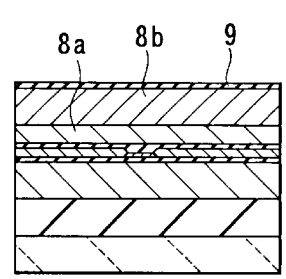
FIG. 8A  FIG. 8B
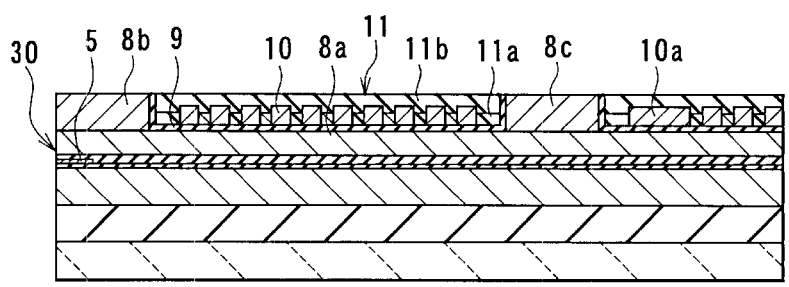
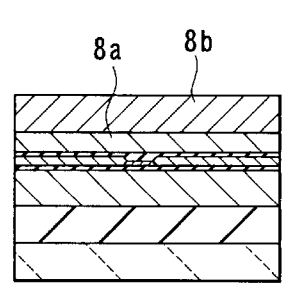
FIG. 9A  FIG. 9B

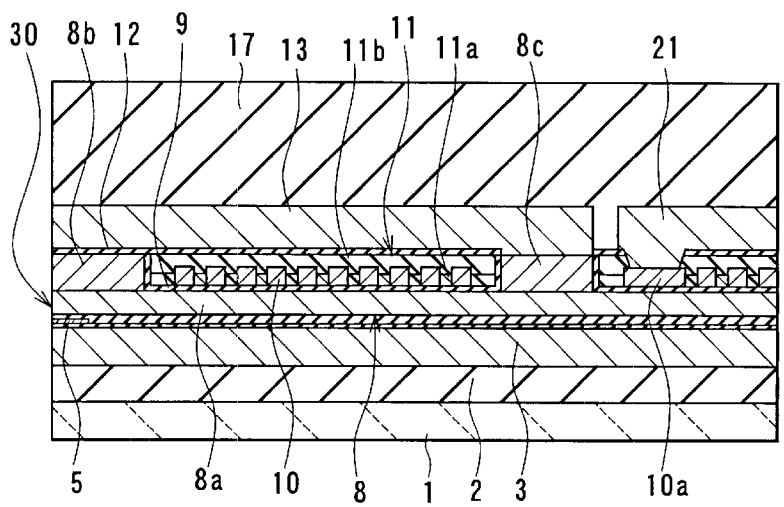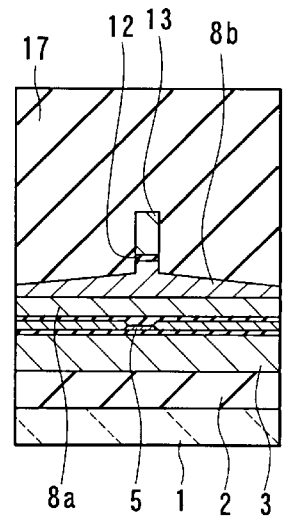
FIG. 10A    FIG. 10B
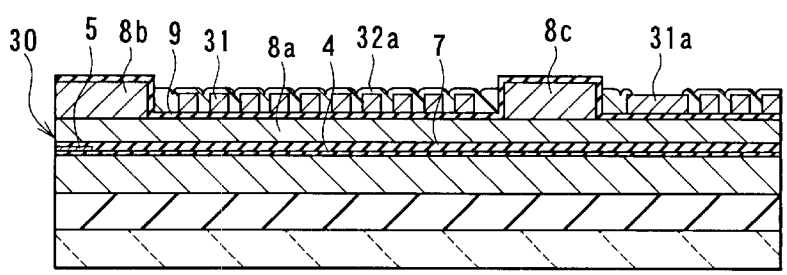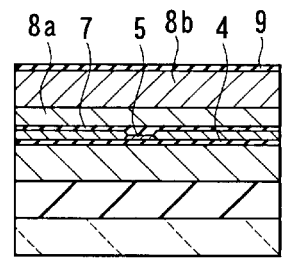
FIG. 11A    FIG. 11B

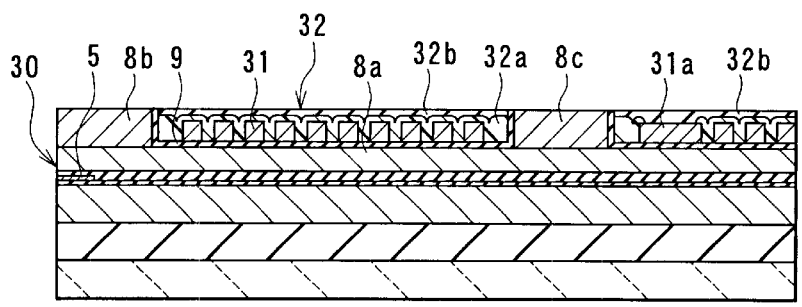 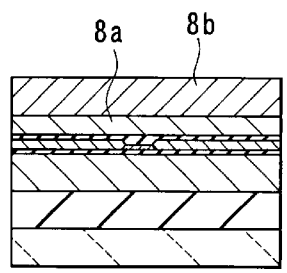
FIG. 12A  FIG. 12B
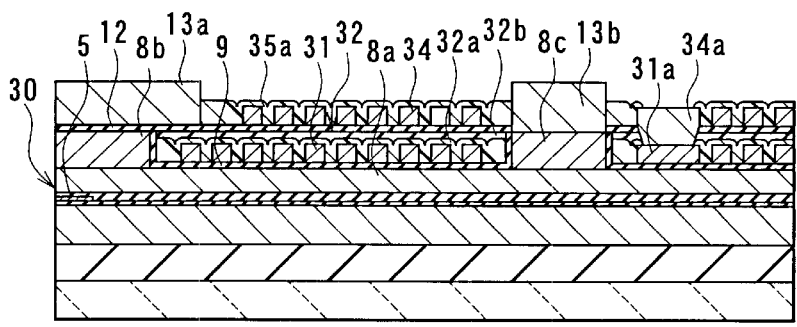 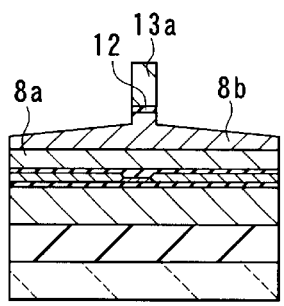
FIG. 13A  FIG. 13B

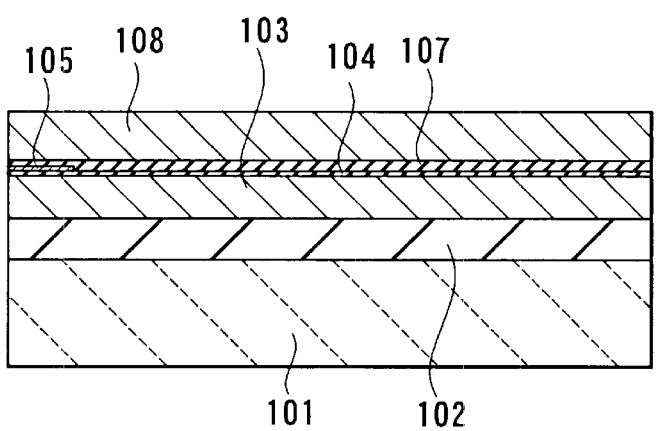
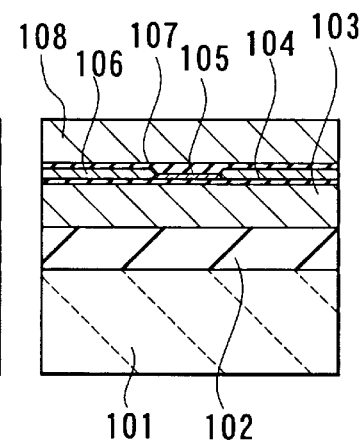
FIG. 16A
RELATED ART
FIG. 16B
RELATED ART
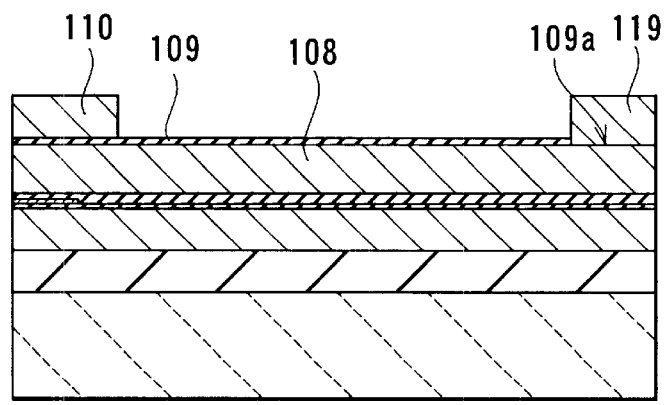
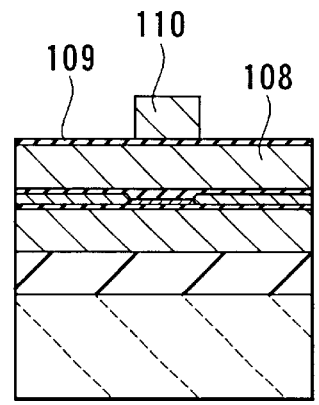
FIG. 17A
RELATED ART
FIG. 17B
RELATED ART

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type magnetic transducer and a method of manufacturing the thin-film magnetic head.

2. Description of the Related Art

Performance improvements in thin-film magnetic heads have been sought with an increase in surface recording density of a hard disk drive. A composite thin-film magnetic head has been widely used, which is made of a layered structure including a recording head having an induction-type magnetic transducer for writing and a reproducing head having a magnetoresistive (MR) element for reading.

It is required to increase the track density on a magnetic recording medium in order to increase the recording density as one of the performance characteristics of a recording head. To achieve this, it is required to implement a recording head of a narrow track structure wherein the track width, that is, the width of a bottom pole and a top pole sandwiching the recording gap layer on the air bearing surface (medium facing surface) is reduced to the micron or submicron order. Semiconductor process techniques are employed to achieve the narrow track structure.

Reference is now made to FIG. 16A to FIG. 19A and FIG. 16B to FIG. 19B to describe an example of a method of manufacturing a composite thin-film magnetic head as a related-art method of manufacturing a thin-film magnetic head. FIG. 16A to FIG. 19A are cross sections each orthogonal to the air bearing surface. FIG. 16B to FIG. 19B are cross sections of a pole portion each parallel to the air bearing surface.

In the manufacturing method, as shown in FIG. 16A and FIG. 16B, an insulating layer 102 made of alumina ($Al_2O_3$), for example, having a thickness of about 5 to 10 μm is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, on the bottom shield gap film 104, a pair of electrode layers 106 are formed. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top shield layer-cum-bottom pole layer (called a bottom pole layer in the following description) 108 having a thickness of about 3 μm is formed. The bottom pole layer 108 is made of a magnetic material and used for both a reproducing head and a recording head.

Next, as shown in FIG. 17A and FIG. 17B, on the bottom pole layer 108, a recording gap layer 109 made of an insulating film such as an alumina film whose thickness is 0.2 μm is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 μm is formed for the recording head. At the same time, a magnetic layer 119 made of a magnetic material is formed for making the magnetic path in the contact hole 109a for making the magnetic path.

Next, as shown in FIG. 18A and FIG. 18B, the recording gap layer 109 and the bottom pole layer 108 are etched through ion-milling, using the top pole tip 110 as a mask. As shown in FIG. 18B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of an alumina film, for example, and having a thickness of about 3 μm is formed on the entire surface. The insulating layer 111 is then polished to the surfaces of the top pole tip 110 and the magnetic layer 119 and flattened.

Next, on the flattened insulating layer 111, a thin-film coil 112 of a first layer is made of copper (Cu), for example, for the induction-type recording head. Next, a photoresist layer 113 is formed into a specific pattern on the insulating layer 111 and the coil 112. Heat treatment is then performed to flatten the surface of the photoresist layer 113. On the photoresist layer 113, a thin-film coil 114 of a second layer is formed. Next, a photoresist layer 115 is formed into a specific pattern on the photoresist layer 113 and the coil 114. Heat treatment is performed to flatten the surface of the photoresist layer 115.

Next, as shown in FIG. 19A and FIG. 19B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider including the above-described layers is performed to form an air bearing surface 118 of the recording head and the reproducing head. The thin-film magnetic head is thus completed.

FIG. 20 is a top view of the thin-film magnetic head shown in FIG. 19A and FIG. 19B. The overcoat layer 117 and other insulating layers and insulating films are omitted in FIG. 20.

In FIG. 19A and FIG. 19B, 'TH' indicates the throat height and 'MR-H' indicates the MR height. The throat height is the length (height) of the pole portion, that is, the portion of the two magnetic layers facing each other with the recording gap layer in between, between the air-bearing-surface-side end and the other end. The MR height is the length (height) of the MR element between the air-bearing-surface-side end and the other end. In FIG. 19A and FIG. 19B, 'P2W' indicates the pole width, that is, the track width of the recording head (hereinafter called the recording track width). In addition to the throat height, the MR height and so on, the apex angle as indicated with θ in FIG. 19A and FIG. 19B is one of the factors that determine the performance of a thin-film magnetic head. The apex is a hill-like raised portion of the coils 112 and 114 covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and recording track width P2W as shown in FIG. 19A or FIG. 19B.

To achieve high density recording, a reduction in track width and an increase in reproducing output are required for a recording head of a composite thin-film magnetic head as described above. A reduction in track width is required for a recording head, too. An improvement in high-frequency characteristic is required, too, for a recording head to cope with an increase in frequency of data to be written. To improve the high-frequency characteristic of a recording head, it is known that it is preferred to reduce the yoke length, that is, the length of the magnetic path made of the magnetic layers between the air-bearing-surface-side end and the other end.

One of the methods to reduce the yoke length may be to reduce the coil pitch. For example, the yoke length is required to be 20 to 10 µm or less in order to implement a thin-film magnetic head that achieves recording density of 30 to 50 gigabits per square inch or more and performs desirable recording in a high-frequency band of 300 to 500 MHz or more. To obtain such a yoke length, the coil pitch is required to be 2.0 to 1.0 µm or less, that is, 0.6 µm, for example. If the coil pitch is 0.6 µm, the line width of winding is 0.3 µm and the space between windings is 0.3 µm, for example.

In prior art a photoresist layer is used as an insulating layer for isolating windings of a coil from each other. The outermost end of the photoresist layer defines the throat height.

However, a rounded portion is formed near the outermost end of the photoresist layer since the photoresist has fluidity during its formation. As a result, the distance between the outermost end of the coil and the zero throat height position (the position of an end of the pole portion opposite to the air bearing surface) is increased in prior art, which is a major factor that prevents a reduction in yoke length. The reason will now be described in detail. Since the yoke length of a two-layer coil can be shorter than that of a single-layer coil, a two-layer coil is adopted to many of recording heads for high frequency application. However, in a related-art thin-film magnetic head, a photoresist film having a thickness of about 2 µm is formed to cover the first layer of the coil for insulating the turns of the coil from each other after the first layer is formed. A rounded portion is formed as described above around the outermost end of the photoresist layer covering the first layer of the coil. A second layer of the coil is then formed on the photoresist layer. The second layer is required to be formed on a flat portion since it is impossible to etch the seed layer of the coil in the rounded portion near the outermost end of the photoresist layer, and the coil is thereby shorted.

Therefore, if the total coil thickness is 2 to 3 µm, the thickness of the photoresist layer insulating the turns of the coil from each other is 2 µm, and the apex angle is 45 to 55 degrees, for example, the yoke length is required to be 6 to 8 µm which is twice as long as the distance between the outermost end of the coil and the neighborhood of the zero throat height position, that is, 3 to 4 µm (the distance between the innermost end of the coil and the portion where the top and bottom pole layers are connected to each other is required to be 3 to 4 µm, too), in addition to the length of the portion corresponding to the coil. This length of the portion other than the portion corresponding to the coil is one of the factors that prevent a reduction in yoke length.

Assuming that a two-layer eleven-turn coil whose line width is 1.5 µm and the space between turns is 0.5 µm is fabricated, for example, the portion of the yoke length corresponding to the coil 112 of the first layer is 11.5 µm, if the first layer is made up of six turns and the second layer is made up of 5 turns, as shown in FIG. 19A and FIG. 19B.

In addition to this length, the total of 6 to 8 µm, that is, the distance between each of the outermost and innermost ends of the coil 112 of the first layer and each of ends of the photoresist layer 113 for insulating the coil 112, is required for the yoke length. The yoke length is therefore 17.5 to 19.5 µm. In the present patent application, the yoke length is the length of a portion of the pole layer except the pole portion and the contact portions as indicated with $L_0$ in FIG. 19A and FIG. 19B. As thus described, it is impossible in the prior art to reduce the yoke length, which prevents improvements in high frequency characteristic.

If a photoresist layer is used as an insulating layer for insulating turns of the coil from each other, problems further arising are that the photoresist tends to be deformed with time and that the photoresist layer is expanded due to heat generated around the coil when the thin-film magnetic head is used and the pole portion protrudes toward the recording medium.

In place of a resin insulation material (organic insulation material) such as a photoresist, the insulating layer for isolating the turns of the coil from each other may be made of an inorganic insulating material harder than a resin insulation material such as alumina or silicon dioxide.

However, if an insulating layer made of an inorganic insulation material is formed in a space between the turns of the coil having an aspect ratio of nearly 1 and a height of 0.5 to 1.0 µm or more and a width of 2.0 µm or less, for example, a problem is that the space between the turns is not completely filled with the inorganic insulation material and gaps called voids or keyholes are likely to be formed in the insulating layer. If such voids are formed in the insulating layer, a washing liquid or water goes into the voids during a number of cleaning steps using liquids performed after the formation of the coil until the magnetic head is completed. Such a liquid or water erodes the coil and the reliability of the head is reduced.

As disclosed in Published Unexamined Japanese Patent Application Hei 7-311912 (1995), after the coil is formed, a resist is applied in which the space between the turns of the coil is half buried, and then the remaining space between the turns is covered with an inorganic oxide. An insulating layer for isolating the turns of the coil from each other may be thus formed. In this case, deformation of the insulating layer with time and generation of voids in the insulating layer are prevented.

However, in this case, too, a rounded portion is formed near the outermost end of the resist layer formed first. It is therefore difficult to reduce the yoke length.

OBJECT AND SUMMARY OF THE INVENTION

It is an object of the invention to provide a thin-film magnetic head and a method of manufacturing the same for reducing the yoke length and preventing generation of voids in the insulating layer for isolating the turns of the thin-film coil from each other.

A thin-film magnetic head of the invention comprises: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. At least one of the magnetic layers includes: a first portion located in a position that faces the at least part of the coil; and a second portion forming one of the pole portions and connected to a surface of the first portion that faces the coil. The at least part of the coil is placed on a side of the second portion. The head further comprises an insulating layer for insulating turns of the at least part of the coil from each other. The insulating layer includes: a first insulating film made of an insulating material that exhibits fluidity during formation and touching a layer to be a base of the at least part of the coil, the first insulating film being placed to fill at least part of the spaces between the turns of the at least part of the coil and between the second portion and the at least part of the coil; and a second insulating film made of an inorganic insulating material and placed to cover the first insulating film.

A method of the invention is provided for manufacturing a thin-film magnetic head comprising: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers.

The method of manufacturing the thin-film magnetic head includes the steps of: forming the first magnetic layer; forming the gap layer on the first magnetic layer; forming the second magnetic layer on the gap layer; forming the coil such that the at least part of the coil is placed between the first and second magnetic layers, the at least part of the coil being insulated from the first and second magnetic layers. In at least one of the step of forming the first magnetic layer and the step of forming the second magnetic layer, at least one of the magnetic layers is formed to include: a first portion located in a position that faces the at least part of the coil; and a second portion forming one of the pole portions and connected to a surface of the first portion that faces the coil. In the step of forming the coil, the at least part of the coil is placed on a side of the second portion. The method further includes the step of forming an insulating layer for insulating turns of the at least part of the coil from each other. The step of forming the insulating layer includes the steps of: forming a first insulating film made of an insulating material that exhibits fluidity during formation such that the first insulating film touches a layer to be a base of the at least part of the coil and is placed to fill at least part of the spaces between the turns of the at least part of the coil and between the second portion and the at least part of the coil; and the step of forming a second insulating film made of an inorganic insulating material to cover the first insulating film.

According to the thin-film magnetic head or the manufacturing method of the invention, the at least part of the thin-film coil is placed on a side of the second portion, so that an end of the at least part of the coil is placed near an end of the second portion. The yoke length is thereby reduced. In the invention the insulating layer for insulating turns of the at least part of the coil from each other includes: the first insulating film made of an insulating material that exhibits fluidity during formation and touching a layer to be a base of the at least part of the coil, the first insulating film being placed to fill at least part of the spaces between the turns of the at least part of the coil and between the second portion and the at least part of the coil; and the second insulating film made of an inorganic insulating material and placed to cover the first insulating film. As a result, generation of voids in the insulating layer for insulating turns of the coil from each other is prevented.

According to the head or the method of the invention, the first insulating film may be made of an organic insulating material or may be a spin-on-glass film.

According to the head or the method, a surface of the second insulating film opposite to the first insulating film may be flattened.

According to the head or the method, the first insulating film may be formed to cover at least part of the thin-film coil or may be formed such that the part of the spaces is filled with the first insulating film.

According to the method of the invention, the step of forming the first insulating layer may include the steps of: forming a film made of the insulating material that exhibits fluidity during formation to cover the at least part of the coil; and removing the film placed on top of the at least part of the coil through etch back.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 7A and FIG. 7B are cross sections for illustrating a step in a method of manufacturing a thin-film magnetic head of a second embodiment of the invention.

FIG. 8A and FIG. 8B are cross sections for illustrating a step that follows FIG. 7A and FIG. 7B.

FIG. 9A and FIG. 9B are cross sections for illustrating a step that follows FIG. 8A and FIG. 8B.

FIG. 10A and FIG. 10B are cross sections for illustrating a step that follows FIG. 9A and FIG. 9B.

FIG. 11A and FIG. 11B are cross sections for illustrating a step in a method of manufacturing a thin-film magnetic head of a third embodiment of the invention.

FIG. 12A and FIG. 12B are cross sections for illustrating a step that follows FIG. 11A and FIG. 11B.

FIG. 13A and FIG. 13B are cross sections for illustrating a step that follows FIG. 12A and FIG. 12B.

FIG. 16A and FIG. 16B are cross sections for illustrating a step in a method of manufacturing a thin-film magnetic head of related art.

FIG. 17A and FIG. 17B are cross sections for illustrating a step that follows FIG. 16A and FIG. 16B.

DETAILED DESCRIPTION OF THE PREFERRED EMBODIMENTS

Figure 6:
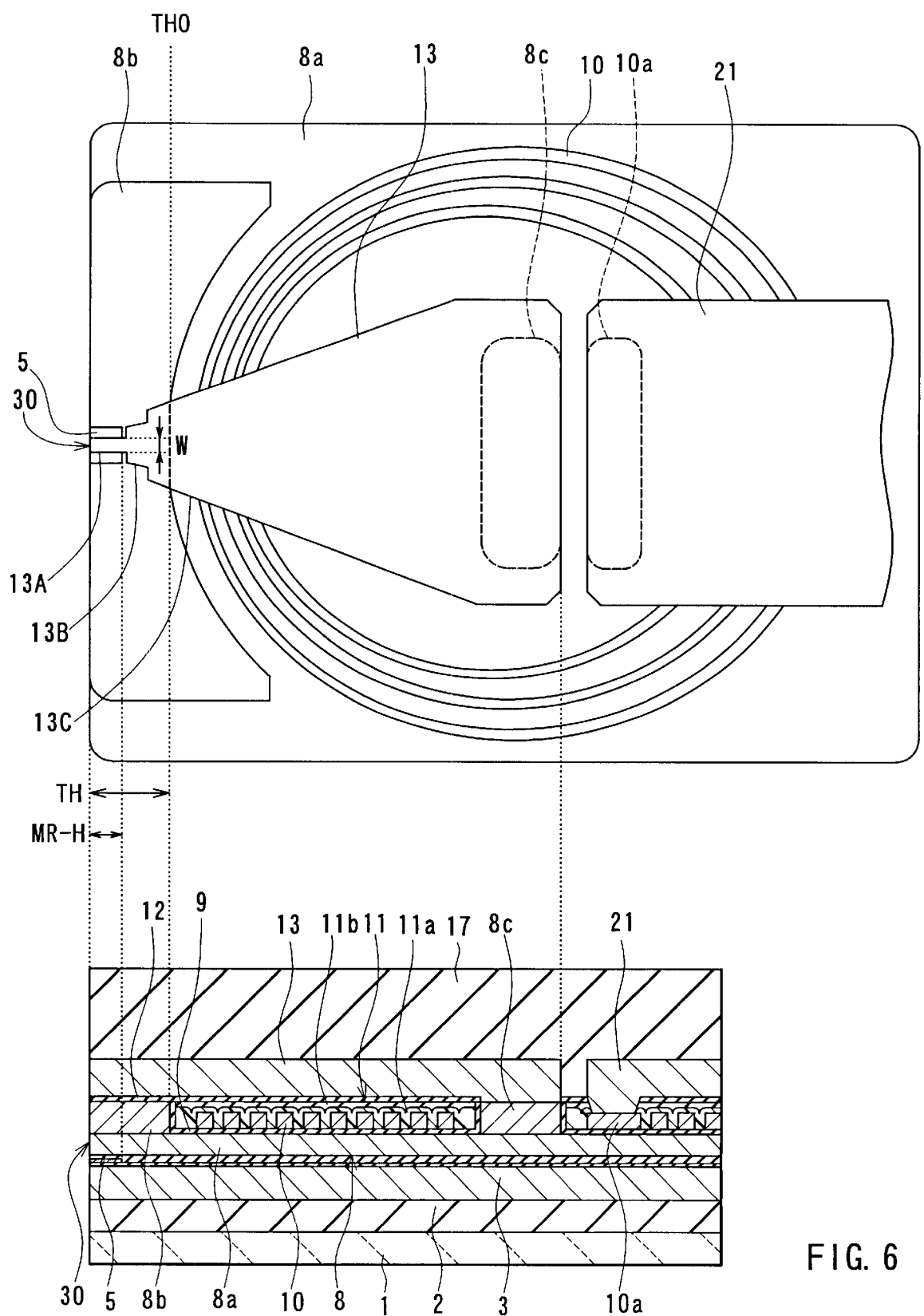
FIG. 6 is an explanatory view illustrating the correspondence of a top view and a cross-sectional view of the main part of the thin-film magnetic head of the first embodiment.

Preferred embodiments of the invention will now be described in detail with reference to the accompanying drawings.

First Embodiment

Reference is now made to FIG. 1A to FIG. 5A, FIG. 1B to FIG. 5B, and FIG. 6 to describe a thin-film magnetic head and a method of manufacturing the thin-film magnetic head of a first embodiment of the invention. FIG. 1A to FIG. 5A are cross sections each orthogonal to an air bearing surface. FIG. 1B to FIG. 5B are cross sections each parallel to the air bearing surface of a pole portion.

In the method of manufacturing the thin-film magnetic head of the embodiment, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed and the surface is flattened.

Next, on the bottom shield layer 3, a bottom shield gap film 4 as an insulating layer having a thickness of about 20 to 40 nm, for example, is formed. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be alumina, aluminum nitride, diamond-like carbon (DLC), and so on. The shield gap films 4 and 7 may be fabricated through sputtering or chemical vapor deposition (CVD). If the shield gap films 4 and 7 made of alumina are fabricated through CVD, materials used are trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a first portion 8a of a top shield layer-cum-bottom pole layer (called a bottom pole layer in the following description) 8 having a thickness of about 1.0 to 2.0 $\mu$m is selectively formed. The bottom pole layer 8 is made of a magnetic material and used for both a reproducing head and a recording head. The bottom pole layer 8 is made up of this first portion 8a, and a second portion 8b and a third portion 8c described later. The first portion 8a of the bottom pole layer is placed in a position facing at least part of a thin-film coil described later.

Next, as shown in FIG. 2A and 2B, the second portion 8b and the third portion 8c of the bottom pole layer 8, each having a thickness of about 1.5 to 2.0 $\mu$m, are formed on the first portion 8a. The second portion 8b makes up a pole portion of the bottom pole layer 8 and is connected to a surface of the first portion 8a on which a thin-film coil is to be formed (that is, the upper side of FIG. 2A and FIG. 2B). The third portion 8c is provided for connecting the first portion 8a to a top pole layer described later. The throat height is defined by the position of an end of a portion of the second portion 8b that faces the top pole layer, the end being opposite to an air bearing surface 30. This position is the zero throat height position.

The second portion 8b and the third portion 8c of the bottom pole layer 8 may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, an insulating film 9 of alumina, for example, is formed over the entire surface. The thickness of the insulating film 9 is about 0.3 to 0.6 $\mu$m.

Next, a photoresist is applied to the top of the insulating film 9 on a side of the second portion 8b of the bottom pole layer 8, and patterned through a photolithography process. A frame (not shown) to be used for making a thin-film coil through the frame plating method is thus formed. A thin-film coil 10 made of copper (Cu), for example, is formed on the insulating film 9 by frame plating through the use of the frame. For example, the thickness of the coil 10 is 0.8 to 1.5 $\mu$m, the line width of the coil is 0.5 to 1.0 $\mu$m, and the space between neighboring lines is 0.5 to 1.0 $\mu$m. Next, the frame is removed. Numeral 10a in the drawings indicates a portion for connecting the thin-film coil 10 to a conductive layer (lead) described later.

Next, a first insulating film 11a made of an insulating material that exhibits fluidity during formation is made through photolithography, for example. The first insulating film 11a is selectively formed to touch the insulating film 9 as a base layer of the coil 10 and to fill the space between the turns of the coil 10 and the space between the third portion 8c of the bottom pole layer 8 and the coil 10, and to cover the coil 10. The first insulating film 11a may be made of an organic insulating material such as a photoresist or may be a spin-on-glass (SOG) film made of applied glass.

Next, heat treatment is performed on the first insulating film 11a to fill the above-mentioned spaces with the first insulating film 11a completely, and to flatten the top surface of the first insulating film 11a. For example, ultraviolet (UV) cure or annealing is performed at a temperature in a range of 100 to 200° C.

Next, as shown in FIG. 3A and FIG. 3B, a second insulating film 11b is formed through sputtering, for example, to cover the first insulating film 11a. The second insulating film 11b is made of an inorganic insulating material and harder than the first insulating film 11a and has a thickness of about 3 to 4 $\mu$m, for example. The inorganic insulating material for making the second insulating film 11b may be alumina or silicon dioxide. Next, the insulating film 11b is polished through CMP, for example, until the second portion 8b and the third portion 8c of the bottom pole layer 8 are exposed, and the surface is flattened.

In such a manner an insulating layer 11 for insulating the space between the turns of the coil 10 is made of the first insulating film 11a and the second insulating film 11b.

Next, as shown in FIG. 4A and FIG. 4B, a recording gap layer 12 made of an insulating material whose thickness is about 0.15 to 0.20 $\mu$m, for example, is formed on the second portion 8b and the third portion 8c of the bottom pole layer 8 exposed, and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the recording gap layer 12 made of alumina is fabricated through CVD, materials used are trimethyl aluminum ($Al(CH_3)_3$) and $H_2O$, for example. Through the use of CVD, it is possible to make the thin and precise recording gap layer 12 with few pinholes.

Next, a portion of the recording gap layer 12 on the third portion 8c of the bottom pole layer 8 is etched to form a contact hole for making a magnetic path. In addition, a portion of the recording gap layer 12 and the insulating layer 11 on the connecting portion 10a of the coil 10 is etched to form a contact hole.

Next, on the recording gap layer 12, a top pole layer 13 having a thickness of about 2.0 to 3.0 $\mu$m is formed. The top pole layer 13 extends from the air bearing surface 30 to the top portion of the third portion 8c of the bottom pole layer 8. A conductive layer 21 having a thickness of about 2.0 to 3.0 $\mu$m is formed to be connected to the portion 10b of the coil 10. The top pole layer 13 is connected to the third portion 8c of the bottom pole layer 8 through the contact hole formed in the top portion of the third portion 8c.

The top pole layer 13 may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 13 may be made of a number of layers of inorganic insulating films and magnetic layers of Permalloy, for example.

Next, as shown in FIG. 5A and FIG. 5B, the recording gap layer 12 is selectively etched through dry etching, using the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer 8 is selectively etched by about 0.3 $\mu$m through argon ion milling, for example. A trim structure as shown in FIG. 5B is thus formed. The trim structure suppresses an increase in the effective track width due to expansion of a magnetic flux generated during writing in a narrow track.

Next, an overcoat layer 17 of alumina, for example, having a thickness of 20 to 40 $\mu$m is formed over the entire surface. The surface of the overcoat layer 17 is then flattened and pads (not shown) for electrodes are formed on the overcoat layer 17. Finally, lapping of the slider including the foregoing layers is performed to form the air bearing surfaces 30 of the recording head and the reproducing head. The thin-film magnetic head of the embodiment is thus completed.

In this embodiment the bottom pole layer 8 made up of the first portion 8a, the second portion 8b and the third portion 8c corresponds to a first magnetic layer of the invention. The top pole layer 13 corresponds to a second magnetic layer of the invention.

FIG. 6 is an explanatory view illustrating the correspondence of a top view (shown in the upper part of FIG. 6) and a cross-sectional view (shown in the lower part of FIG. 6) of the main part of the thin-film magnetic head of the embodiment. The overcoat layer 17 and other insulating layers and insulating films are omitted in the top view of FIG. 6. In FIG. 6 'TH' indicates the throat height. 'TH0' indicates the zero throat height position. 'MR-H' indicates the MR height. 'W' indicates the recording track width.

In this embodiment, in a portion of the second portion 8b of the bottom pole layer 8 that faces the top pole layer 13, an end of this portion opposite to the air bearing surface 30 forms a straight line parallel to the air bearing surface 30. An end of the other portion of the second portion 8b that is opposite to the air bearing surface 30 forms a circular arc similar to the shape of the periphery of the thin-film coil 10. In the embodiment, as described above, in the portion of the second portion 8b that faces the top pole layer 13, the end of this portion opposite to the air bearing surface 30 forms a straight line parallel to the air bearing surface 30. As a result, the throat height and the zero throat height position is precisely controlled.

In the embodiment the top pole layer 13 defines track width W. As shown in FIG. 6, the top pole layer 13 has a first portion 13A, a second portion 13B and a third portion 13C, in the order in which the closest to the air bearing surface 30 comes first. The width of the first portion 13A is equal to track width W. The second portion 13B is greater than the first portion 13A in width. The third portion 13C is greater than the second portion 13B in width. The width of the third portion 13C gradually decreases toward the air bearing surface 30. The width of the second portion 13B gradually decreases toward the air bearing surface 30, too.

Edges of the top pole layer 13 connecting edges of the first portion 13A at ends of its width to edges of the second portion 13B at ends of its width are parallel to the air bearing surface 30. Similarly, edges of the top pole layer 13 connecting edges of the second portion 13B at ends of its width to edges of the third portion 13C at ends of its width are parallel to the air bearing surface 30.

In the top pole layer 13 the position of the interface between the first portion 13A and the second portion 13B is located near the zero MR height position (the position of an end of the MR element 5 opposite to the air bearing surface 30).

In the top pole layer 13 the position of the interface between the second portion 13B and the third portion 13C (the position near the step between the second portion 13B and the third portion 13C shown in FIG. 6) is located closer to the air bearing surface 30 than zero throat height position TH0 (that is, located on the left side of FIG. 6).

As described so far, the thin-film magnetic head of the embodiment comprises the reproducing head and the recording head. The reproducing head has: the MR element 5; and the bottom shield layer 3 and the top shield layer (bottom pole layer 8) for shielding the MR element 5. Portions of the bottom shield layer 3 and the top shield layer facing toward a recording medium are opposed to each other, the MR element 5 being placed between the portions.

The recording head has the bottom pole layer 8 (the first portion 8a, the second portion 8b and the third portion 8c) and the top pole layer 13 magnetically coupled to each other, each of which is made up of at least one layer. The bottom pole layer 8 and the top pole layer 13 includes pole portions opposed to each other and placed in regions on a side of the head that faces toward a recording medium. The recording head further has: the recording gap layer 12 placed between the pole portion of the bottom pole layer 8 and the pole portion of the top pole layer 13; and the thin-film coil 10 at least part of which is placed between the bottom pole layer 8 and the top pole layer 13, the at least part of the coil being insulated from the bottom pole layer 8 and the top pole layer 13.

In the embodiment the bottom pole layer 8 has: the first portion 8a placed in a position facing at least part of the thin-film coil 10; and the second portion 8b connected to a surface of the first portion 8a facing the coil 10 (that is, the upper side of the drawing). The second portion 8b forms the pole portion and defines the throat height. The thin-film coil 10 is placed on a side of the second portion 8b (that is, the right side of the drawing).

In the embodiment the insulating layer 11 for insulating the turns of the thin-film coil 10 from each other includes the first insulating film 11a and the second insulating film 11b. The first insulating film 11a is made of an insulating material that exhibits fluidity during formation and touches the insulating film 9 as the base layer of the coil 10. The first insulating film 11a is placed to fill at least part of the space between the turns of the coil 10, the space between the second portion 8b of the bottom pole layer 8 and the coil 10, and the space between the third portion 8c of the bottom pole layer 8 and the coil 10. The second insulating film 11b is made of an inorganic insulating material and placed to cover the first insulating film 11a. The top surface of the second insulating film 11b is flattened, together with the second portion 8b and the third portion 8c.

In the embodiment the thin-film coil 10 is placed on the side of the second portion 8b of the bottom pole layer 8, and formed on the flat insulating film 9. As a result, the fine thin-film coil 10 is fabricated with precision, according to the embodiment. Furthermore, an end of the coil 10 is placed near the zero throat height position, that is, an end of the second portion 8b opposite to the air bearing surface 30 in the embodiment.

According to the embodiment as thus described, the yoke length is reduced by about 30 to 40 percent of that of a prior-art head, for example. As a result, the magnetomotive force generated by the thin-film coil 10 is efficiently used for recording. It is therefore possible to provide a thin-film magnetic head having a recording head with an excellent high frequency characteristic, an excellent nonlinear transition shift (NLTS) characteristic and an excellent overwrite characteristic, according to the embodiment.

Since the embodiment achieves a reduction in the yoke length, the entire length of the coil 10 is reduced without changing the number of turns. The resistance of the coil 10 is thereby reduced. Consequently, it is possible to reduce the thickness of the coil 10.

In the embodiment the insulating layer 11 for insulating the turns of the thin-film coil 10 from each other includes the first insulating film 11a and the second insulating film 11b. The first insulating film 11a is made of an insulating material that exhibits fluidity during formation and touches the insulating film 9 as the base layer of the coil 10. The first insulating film 11a is placed to fill at least part of the space between the turns of the coil 10, the space between the second portion 8b of the bottom pole layer 8 and the coil 10, and the space between the third portion 8c of the bottom pole layer 8 and the coil 10. The second insulating film 11b is made of an inorganic insulating material and placed to cover the first insulating film 11a.

As a result, according to the embodiment, the above-mentioned spaces are completely filled with the first insulating film 11a. It is thereby possible to prevent formation of voids in the insulating layer 11. Since the second insulating film 11b made of an inorganic insulating material is placed to cover the first insulating film 11a in the embodiment, it is possible to prevent deformation of the insulating layer 11 with time. Because of these features, the embodiment achieves an improvement in reliability of the thin-film magnetic head.

The second insulating film 11b made of an inorganic insulating material is placed to cover the first insulating film 11a in the embodiment. As a result, it is possible to prevent the pole portion from protruding toward a recording medium because of expansion due to heat generated around the coil 10, during the use of the thin-film magnetic head. It is therefore possible to have the slider flying near the recording medium. The characteristics of the head is thereby improved.

According to the embodiment, the top surface of the second insulating film 11b is flattened, together with the top surfaces of the second portion 8b and the third portion 8c. As a result, the top pole layer 13 that defines the recording track width is formed on the flat surface. The top pole layer 13 is thus formed with accuracy even though the track width is reduced to the half-micron order or quarter-micron order. The track width is thereby precisely controlled.

Second Embodiment

Reference is now made to FIG. 7A to FIG. 10A and FIG. 7B to FIG. 10B to describe a thin-film magnetic head and a method of manufacturing the same of a second embodiment of the invention. FIG. 7A to FIG. 10A are cross sections each orthogonal to the air bearing surface. FIG. 7B to FIG. 10B are cross sections each parallel to the air bearing surface of the pole portion.

The steps performed until the thin-film coil 10 is formed in the method of manufacturing the thin-film magnetic head of this embodiment are similar to those of the first embodiment.

In the following step of the method of the second embodiment, as shown in FIG. 7A and FIG. 7B, the first insulating film 11a made of an insulating material that exhibits fluidity during formation is made through photolithography, for example. The first insulating film 11a is selectively formed to touch the insulating film 9 as a base layer of the coil 10 and to fill the space between the turns of the coil 10, the space between the second portion 8b of the bottom pole layer 8 and the coil 10, and the space between the third portion 8c of the bottom pole layer 8 and the coil 10, and to cover the coil 10.

Next, heat treatment is performed on the first insulating film 11a to fill the above-mentioned spaces with the first insulating film 11a completely, and to flatten the top surface of the first insulating film 11a. For example, UV cure or annealing is performed at a temperature in a range of 100 to 200° C.

Next, as shown in FIG. 8A and FIG. 8B, at least a portion of the first insulating film 11a located on top of the thin-film coil 10 is removed by etch back through anisotropic etching using a $CH_4$-base gas or $O_2$ plasma. In this embodiment the first insulating film 11a on which etch back has been performed may either fill all of the above-mentioned spaces or fill part of the spaces as shown in FIG. 8A and FIG. 8B.

Next, as shown in FIG. 9A and FIG. 9B, the second insulating film 11b is formed to cover the first insulating film 11a. The second insulating film 11b is made of an inorganic insulating material and has a thickness of about 3 to 4 μm, for example. Next, the insulating film 11b is polished through CMP, for example, until the second portion 8b and the third portion 8c of the bottom pole layer 8 are exposed, and the surface is flattened.

In such a manner the insulating layer 11 for insulating the space between the turns of the coil 10 is made of the first insulating film 11a and the second insulating film 11b.

The following steps are similar to those of the first embodiment. FIG. 10A and FIG. 10B are cross sectional views of the thin-film magnetic head of the second embodiment.

The remainder of the configuration, operations and effects of the embodiment are similar to those of the first embodiment.

Third Embodiment

Reference is now made to FIG. 11A to FIG. 14A, FIG. 11B to FIG. 14B, and FIG. 15 to describe a thin-film magnetic head and a method of manufacturing the same of a third embodiment of the invention. FIG. 11A to FIG. 14A are cross sections each orthogonal to the air bearing surface. FIG. 11B to FIG. 14B are cross sections each parallel to the air bearing surface of the pole portion.

The steps performed until the insulating film 9 is formed in the method of manufacturing the thin-film magnetic head of this embodiment are similar to those of the first embodiment.

In the following step of the method of the third embodiment, as shown in FIG. 11A and FIG. 11B, a first layer 31 of the thin-film coil made of copper, for example, is formed through a step similar to the step of forming the thin-film coil 10 of the first embodiment. For example, the thickness of the first layer 31 is 0.8 to 1.5 μm, the line width of the coil is 0.5 to 1.0 μm, and the space between neighboring lines is 0.5 to 1.0 μm. Numeral 31a in the drawings indicates a portion for connecting the first layer 31 to a second layer described of the thin-film coil later.

Next, an insulating film 32a similar to the first insulating film 11a is formed through a step similar to the step of forming the first insulating film 11a of the first embodiment. Heat treatment is then performed on the insulating film 32a.

Next, as shown in FIG. 12A and FIG. 12B, an insulating film 32b similar to the second insulating film 11b is formed through a step similar to the step of forming the second insulating film 11b of the first embodiment. The insulating film 32b is polished until the second portion 8b and the third portion 8c of the bottom pole layer 8 are exposed, and the surface is flattened.

In such a manner an insulating layer 32 for insulating the space between the turns of the first layer 31 of the coil is made of the insulating films 32a and 32b.

Next, as shown in FIG. 13A and FIG. 13B, the recording gap layer 12 made of an insulating material whose thickness is about 0.15 to 0.20 μm, for example, is formed on the second portion 8b and the third portion 8c of the bottom pole layer 8 exposed, and the insulating layer 32.

Next, a portion of the recording gap layer 12 located on the third portion 8c of the bottom pole layer 8 is etched to form a contact hole for making a magnetic path.

Next, on the recording gap layer 12, a pole portion layer 13a having a thickness of 2.0 to 3.0 μm, for example, is fabricated to form the pole portion of the top pole layer 13. A magnetic layer 13b having a thickness of 2.0 to 3.0 μm is formed in the contact hole formed in the third portion 8c of the bottom pole layer 8. The top pole layer 13 of this embodiment is made up of the pole portion layer 13a and the magnetic layer 13b, and a yoke portion layer 13c described later. The magnetic layer 13b is a portion for connecting the yoke portion layer 13c to the third portion 8c of the bottom pole layer 8.

The pole portion layer 13a and the magnetic layer 13b of the top pole layer 13 may be made of NiFe (80 weight % Ni and 20 weight % Fe), or NiFe (45 weight % Ni and 55 weight % Fe) as a high saturation flux density material through plating, or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 13a of the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer 8 is selectively etched by about 0.3 μm through argon ion milling, for example. A trim structure as shown in FIG. 13B is thus formed.

Next, the recording gap layer 12 and the insulating layer 32 located on top of the connection portion 31a of the first layer 31 of the thin-film coil are selectively removed to form a contact hole.

Next, the second layer 34 of the thin-film coil made of copper, for example, is formed by frame plating on the recording gap layer 12 on a side of the pole portion layer 13a of the top pole layer 13. For example, the thickness of the second layer 34 is 0.8 to 1.5 μm, the line width of the coil is 0.5 to 1.0 μm, and the space between neighboring lines is 0.5 to 1.0 μm. Numeral 34a in the drawings indicates a portion for connecting the second layer 34 of the coil to the first layer 31.

Next, an insulating film 35a made of an insulating material that exhibits fluidity during formation is made through photolithography, for example. The insulating film 35a is selectively formed to touch the recording gap layer 12 as a base layer of the second layer 34 of the coil and to fill the space between the turns of the second layer 34, the space between the pole portion layer 13a and the second layer 34, and the space between the magnetic layer 13b and the second layer 34, and to cover the second layer 34. The insulating film 35a may be made of an organic insulating material such as a photoresist or may be a spin-on-glass film.

Next, heat treatment is performed on the insulating film 35a to fill the above-mentioned spaces with the insulating film 35a completely, and to flatten the top surface of the insulating film 35a. For example, UV cure or annealing is performed at a temperature in the range of 100 to 200° C.

Figure 14A:
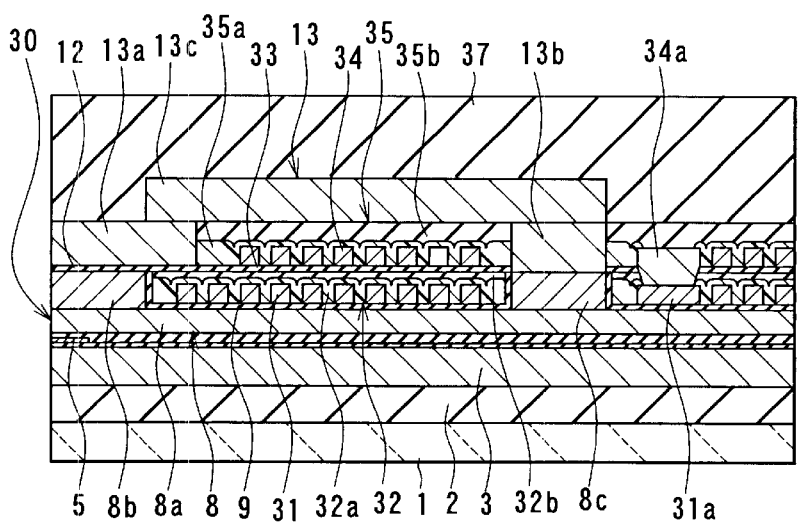
FIG. 14A and FIG. 14B are cross sections for illustrating a step that follows FIG. 13A and FIG. 13B.
Figure 14B:
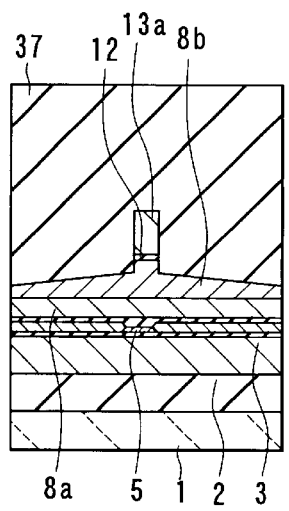

Next, as shown in FIG. 14A and FIG. 14B, an insulating film 35b is formed to cover the insulating film 35a. The insulating film 35b is made of an inorganic insulating material and has a thickness of about 3 to 4 μm, for example. The inorganic insulating material for making the insulating film 35b may be alumina or silicon dioxide. Next, the insulating film 35b is polished through CMP, for example, until the pole portion layer 13a and the magnetic layer 13b of the top pole layer 13 are exposed, and the surface is flattened.

In such a manner an insulating layer 35 for insulating the space between the turns of the second layer 34 of the coil is made of the insulating films 35a and 35b.

Next, the yoke portion layer 13c having a thickness of 2.0 to 3.0 μm, for example, is formed on the flattened pole portion layer 13a and magnetic layer 13b of the top pole layer 13 and insulating layer 35. The yoke portion layer 13c is provided for the recording head and made of a magnetic material. The yoke portion layer 13c is in contact with the third portion 8c of the bottom pole layer 8 through the magnetic layer 13b and magnetically coupled thereto. The yoke portion layer 13c may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 13c may be made of a number of layers of inorganic insulating films and magnetic layers of Permalloy, for example.

In this embodiment an end face of the yoke portion layer 13c of the top pole layer 13 on a side of the air bearing surface 30 is located at a distance from the air bearing surface 30 (the right side of FIG. 14A).

Next, an overcoat layer 37 of alumina, for example, having a thickness of 20 to 40 μm is formed over the entire surface. The surface of the overcoat layer 37 is then flattened and pads (not shown) for electrodes are formed on the overcoat layer 37. Finally, lapping of the slider including the foregoing layers is performed to form the air bearing surfaces 30 of the recording head and the reproducing head. The thin-film magnetic head of the embodiment is thus completed.

In this embodiment the top pole layer 13 made up of the pole portion layer 13a, the magnetic layer 13b and the yoke portion layer 13c corresponds to the second magnetic layer of the invention. The pole portion layer 13a corresponds to a second portion of the magnetic layer of the invention. The yoke portion layer 13c corresponds to a first portion of the magnetic layer of the invention.

Figure 15:
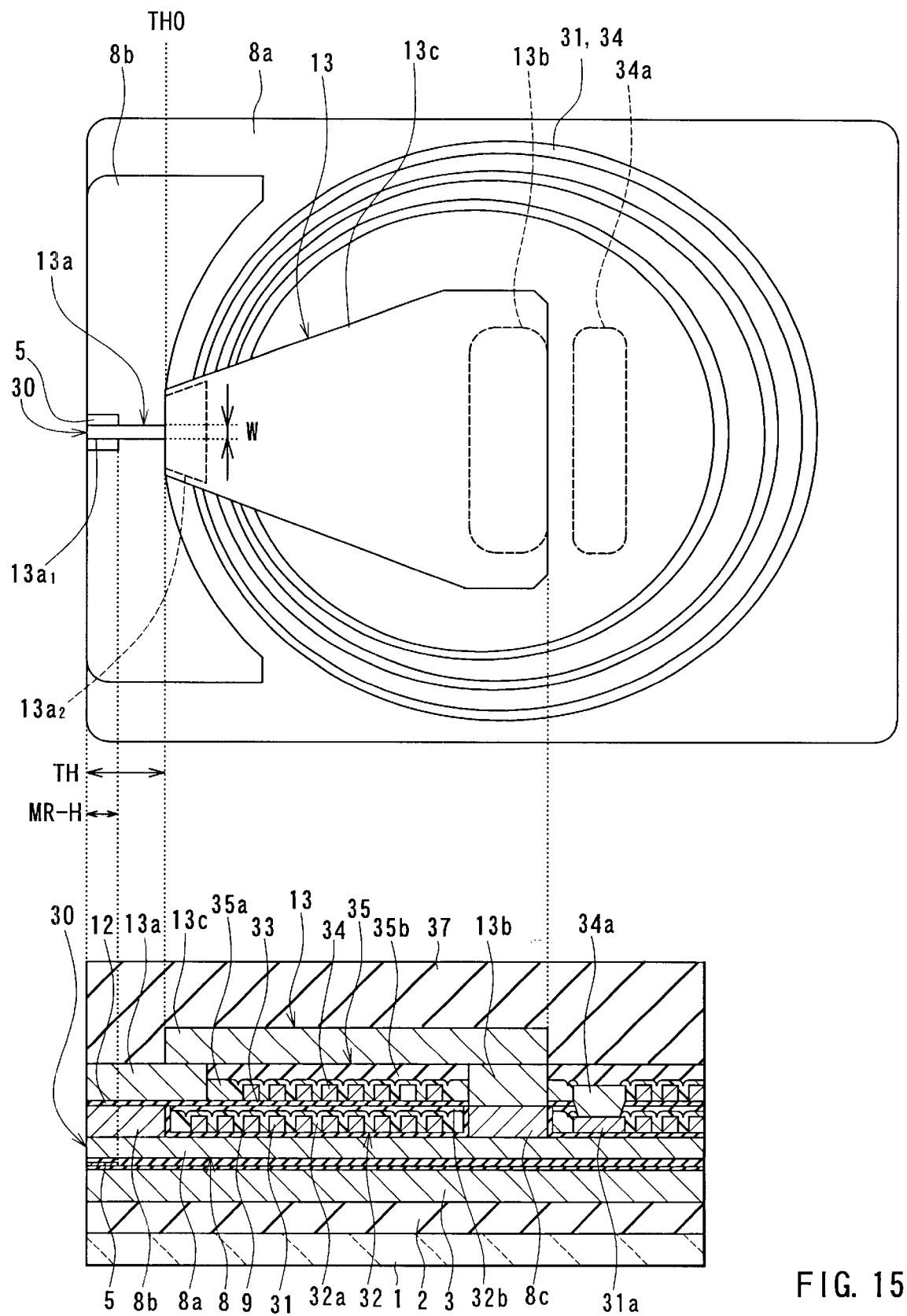
FIG. 15 is an explanatory view illustrating the correspondence of a top view and a cross-sectional view of the main part of the thin-film magnetic head of the third embodiment.
Figures 18A, 18B:
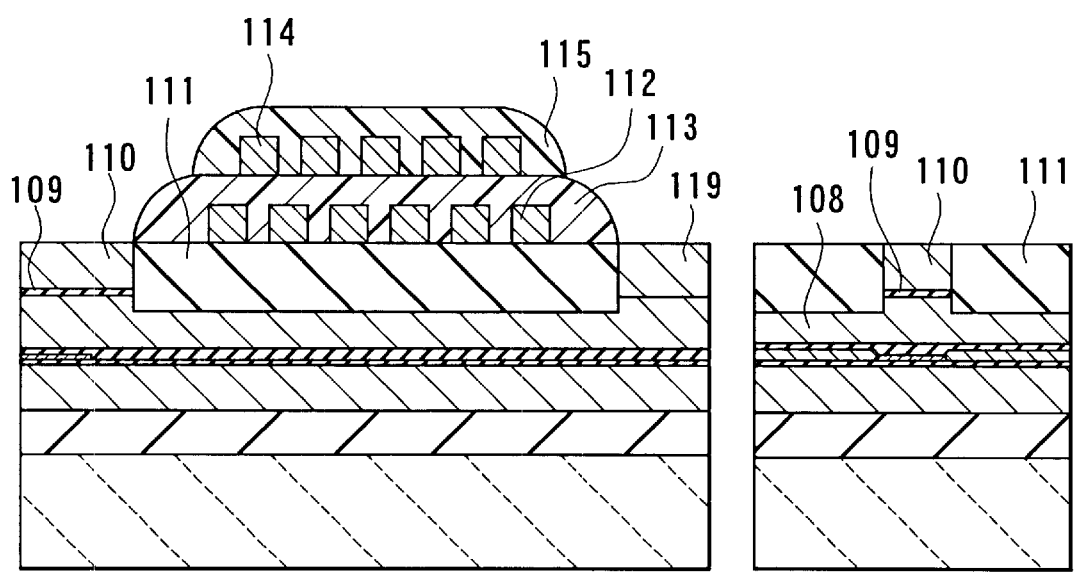
FIG. 18A and FIG. 18B are cross sections for illustrating a step that follows FIG. 17A and FIG. 17B.
Figures 19A, 19B:
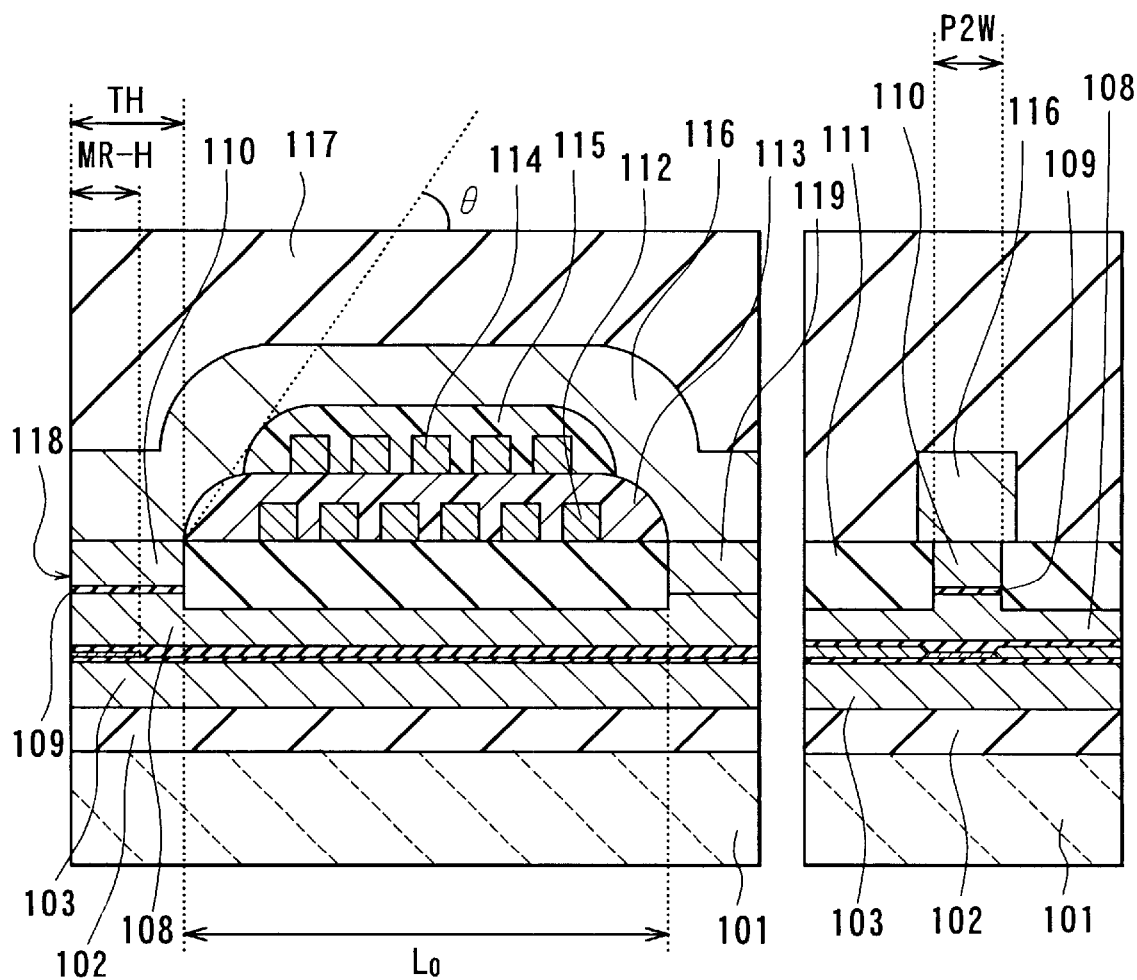
FIG. 19A and FIG. 19B are cross sections for illustrating a step that follows FIG. 18A and FIG. 18B.
Figure 20:
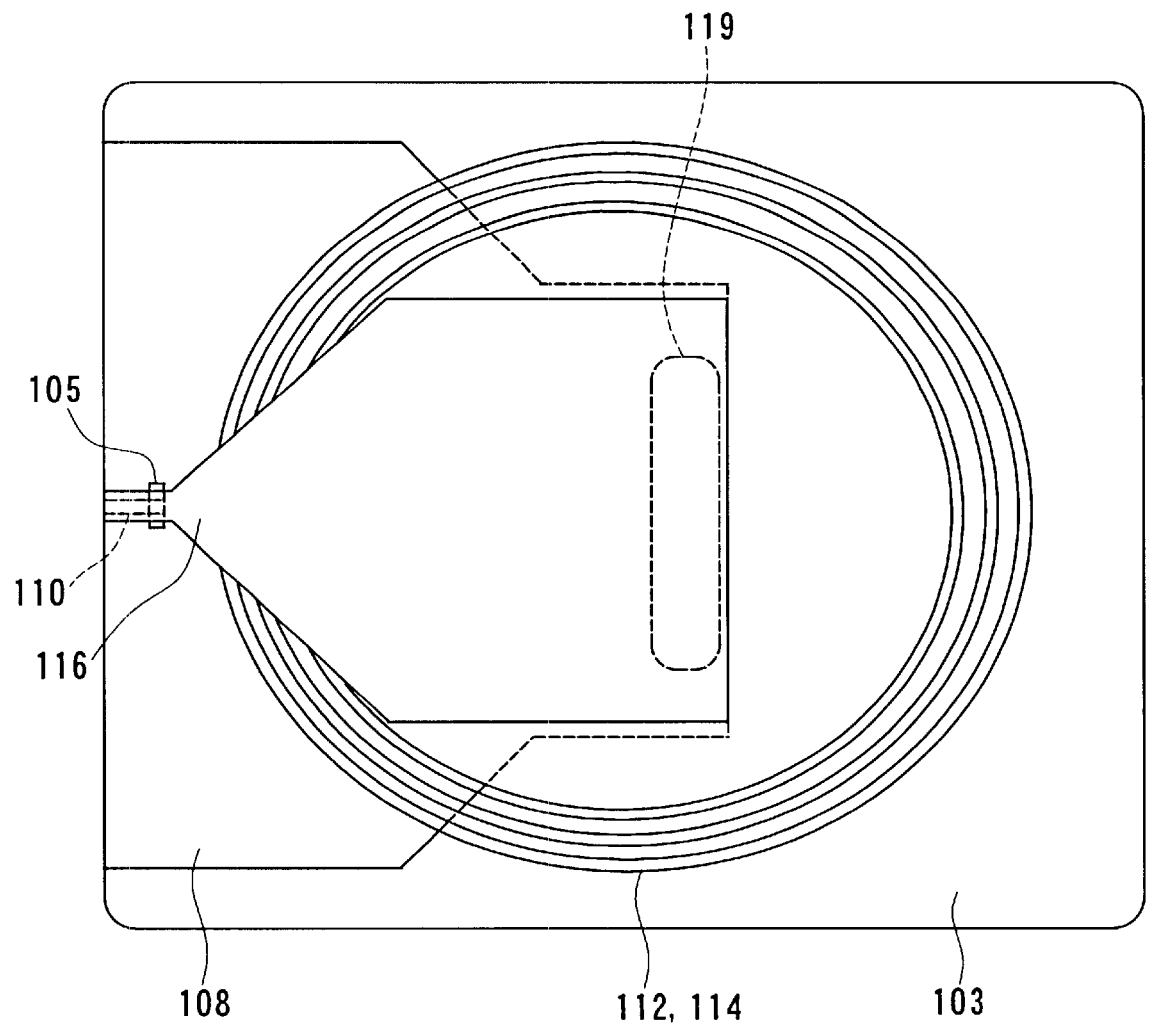
FIG. 20 is a top view of the related-art thin-film magnetic head.

FIG. 15 is an explanatory view illustrating the correspondence of a top view (shown in the upper part of FIG. 15) and a cross-sectional view (shown in the lower part of FIG. 15) of the main part of the thin-film magnetic head of the embodiment. The overcoat layer 37 and other insulating layers and insulating films are omitted in the top view of FIG. 15. In FIG. 15 'TH' indicates the throat height. 'TH0' indicates the zero throat height position. 'MR-H' indicates the MR height. 'W' indicates the recording track width.

As shown in FIG. 15, the pole portion layer 13a of the top pole layer 13 has a first portion $13a_1$ located closer to the air bearing surface 30, and a second portion $13a_2$ coupled to the first portion $13a_1$ and located at a distance from the air bearing surface 30. The width of the first portion $13a_1$ is equal to recording track width W. The second portion $13a_2$ is greater than the first portion $13a_1$ in width. The interface between the first portion $13a_1$ and the second portion $13a_2$ (that is, the position of the step between the first portion $13a_1$ and the second portion $13a_2$) is located near zero throat height position TH0.

The width of a portion of the yoke portion layer 13c of the top pole layer 13 overlaid on the pole portion layer 13a is equal to the width of the pole portion layer 13a. The width of the yoke portion layer 13c increases toward the side opposite to the air bearing surface 30 and then maintains a specific width.

According to the third embodiment thus described, the first layer 31 of the thin-film coil is placed on a side of the second portion 8b of the bottom pole layer 8, and formed on the flat insulating film 9. Furthermore, the top surface of the insulating layer 32 for insulating the turns of the first layer 31 of the coil from each other is flattened, together with the top surface of the second portion 8b. On the flattened surfaces, the recording gap layer 12 is placed on which the pole portion layer 13a and the second layer 34 of the coil are formed. The second layer 34 is located on a side of the pole portion layer 13a. As a result, both the first layer 31 and the second layer 34 of the coil are formed into minute sizes with accuracy. In addition, an end of the first layer 31 is located near an end of the second portion 8b of the bottom pole layer 8, and end of the second layer 34 is located near an end of the pole portion layer 13a of the top pole layer 13. As a result, the yoke length is further reduced in the third embodiment, compared to the first embodiment, since the thin-film coil is made up of two layers.

In the third embodiment the insulating layer 32 for insulating the turns of the first layer 31 of the thin-film coil from each other includes the insulating film 32a and the insulating film 32b. The insulating film 32a is made of an insulating material that exhibits fluidity during formation and touches the insulating film 9 as the base layer of the first layer 31. The insulating film 32a is formed to fill at least part of the space between the turns of the first layer 31, the space between the second portion 8b of the bottom pole layer 8 and the first layer 31, and the space between the third portion 8c of the bottom pole layer 8 and the first layer 31. The insulating film 32b is made of an inorganic insulating material and placed to cover the insulating film 32a.

In this embodiment the insulating layer 35 for insulating the turns of the second layer 34 of the thin-film coil from each other includes the insulating film 35a and the insulating film 35b. The insulating film 35a is made of an insulating material that exhibits fluidity during formation and touches the recording gap layer 12 as the base layer of the second layer 34. The insulating film 35a is formed to fill at least part of the space between the turns of the second layer 34, the space between the pole portion layer 13a of the top pole layer 13 and the second layer 34, and the space between the magnetic layer 13b of the top pole layer 13 and the second layer 34. The insulating film 35b is made of an inorganic insulating material and placed to cover the insulating film 35a.

As a result, according to the embodiment, as in the first embodiment, it is possible to prevent formation of voids in the insulating layers 32 and 35. It is also possible to prevent deformation of the insulating layers 32 and 35 with time. The reliability of the thin-film magnetic head is thereby improved. In addition, as in the first embodiment, it is possible to prevent the pole portion from protruding toward a recording medium because of expansion due to heat generated around the first layer 31 and the second layer 34 of the coil, during the use of the thin-film magnetic head. It is therefore possible to have the slider flying near the recording medium. The characteristics of the head are thereby improved.

According to the embodiment, the first layer 31 of the coil is placed on a side of the second portion 8b of the bottom pole layer 8. In addition, the top surface of the insulating layer 32 for insulating the turns of the first layer 31 from each other is flattened, together with the top surface of the second portion 8b. As a result, the pole portion layer 13a of the top pole layer 13 that defines the recording track width is formed on the flat surface. The pole portion layer 13a is thus formed with accuracy even though the track width is reduced to the half-micron order or quarter-micron order. The track width is thereby precisely controlled.

According to the embodiment, the second layer 34 of the coil is placed on a side of the pole portion layer 13a of the top pole layer 13. In addition, the top surface of the insulating layer 35 for insulating the turns of the second layer 34 from each other is flattened, together with the top surface of the pole portion layer 13a. As a result, the yoke portion layer 13c of the top pole layer 13 is formed on the flat surface, too. The yoke portion layer 13c is thereby formed into small dimensions. It is thus possible to prevent so-called side write that allows writing of data in a region where data is not expected to be written.

In the embodiment the end face of the yoke portion layer 13c on a side of the air bearing surface 30 is located at a distance from the air bearing surface. As a result, the yoke portion layer 13c is prevented from being exposed in the air bearing surface 30 even if the throat height is small. Side write is thereby prevented.

The insulating films 32 and 35 may be formed through steps similar to those of the insulating layer 11 of the second embodiment. The remainder of the configuration, operations and effects of the embodiment are similar to those of the first embodiment.

The present invention is not limited to the foregoing embodiments but may be practiced in still other ways. For example, in the foregoing embodiments, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

The invention may be applied to a thin-film magnetic head having only an induction-type magnetic transducer for performing both reading and writing.

According to the thin-film magnetic head or the method of manufacturing the same of the invention described so far, at least one of the magnetic layers includes: the first portion located in a position facing at least part of the thin-film coil; and the second portion forming the pole portion and connected to a surface of the first portion that faces the thin-film coil. At least part of the coil is placed on a side of the second portion. It is thereby possible that an end of at least part of the coil is located near an end of the second portion. As a result, the yoke length is reduced. In the invention the insulating layer for insulating the turns of at least part of the thin-film coil from each other includes the first insulating film and the second insulating film. The first insulating film is made of an insulating material that exhibits fluidity during formation and touches the base layer of the at least part of the coil. The first insulating film is placed to fill at least part of the space between the turns of the at least part of the coil and the space between the second portion and the at least part of the coil. The second insulating film is made of an inorganic insulating material and placed to cover the first insulating film. As a result, it is possible to prevent generation of voids in the insulating layer insulating the turns of the thin-film coil from each other.

The surface of the second insulating film opposite to the first insulating film may be flattened. In this case, the layer formed on the second insulating film is fabricated with precision.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
 a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer;
 a gap layer provided between the pole portions of the first and second magnetic layers; and
 a thin-film coil at least part of which is placed between the first and second magnetic layers, the at least part of the coil being insulated from the first and second magnetic layers; wherein
 each of the first and second magnetic layers includes a first portion located in a position that faces the at least part of the coil, and a second portion forming the pole portions and connected to a surface of the first portion that faces the coil; and
 the thin-film coil includes a first coil layer at least part of which is placed on a side of the second portion of the first magnetic layer, and a second coil layer at least part of which is placed on a side of the second portion of the second magnetic layer, the gap layer separating the at least part of the first coil layer from the at last part of the second coil layer;
 the head further comprising a first insulating layer on one side of the gap layer for insulating turns of the at least part of the first coil layer from each other, and a second insulating layer on the opposite side of the gap layer for insulating turns of the at least part of the second coil layer from each other; wherein
 the first insulating layer includes a first insulating film made of an insulating material that exhibits fluidity during formation and touching a layer to be a base of the at least part of the first coil layer, the first insulating film being placed to fill at least part of spaces between the turns of the at least part of the first coil layer and between the second portion of the first magnetic layer and the at least part of the first coil layer and a second insulating film distinct from the first insulating film and made of an inorganic insulating material and placed to cover the first insulating film, a surface of the second insulating film opposite to the first insulating film being flattened and the gap layer being formed on the flattened surface of the second insulating film; and the second insulating layer includes a first insulating film made of an insulating material that exhibits fluidity during formation and touching a layer to be a base of the at least part of the second coil layer, the first insulating film being placed on the gap layer to fill at least part of spaces between the turns of the at least part of the second coil layer and between the second portion of the second magnetic layer and the at least part of the second coil layer; and a second insulating film distinct from the first insulating film and made of an inorganic insulating material and placed to cover the first insulating film, a surface of the second insulating film opposite to the first insulating film being flattened.

2. The thin-film magnetic head according to claim 1, wherein the first insulating film of the first insulating layer and the first insulating film of the second insulating layer are each made of an organic insulating material.

3. The thin-film magnetic head according to claim 1, wherein the first insulating film of the first insulating layer and the first insulating film of the second insulating layer are spin-on-glass films.

4. The thin-film magnetic head according to claim 1, wherein the first insulating film of the first insulating layer and the first insulating film of the second insulating layer are each located to cover the at least part of the thin-film coil.

5. The thin-film magnetic head according to claim 1, wherein the first insulating film of the first insulating layer is placed to fill part of the spaces between the turns of the at least part of the first layer of the coil and between the second portion of the first magnetic layer and the at least part of the first layer of the coil; and the first insulating film of the second insulating layer is placed to fill part of the spaces between the turns of the at least part of the second layer of the coil and between the second portion of the second magnetic layer and the at least part of the second layer of the coil.

* * * * *